United States Patent [19]

Morton

[11] Patent Number: 5,312,214
[45] Date of Patent: May 17, 1994

[54] SECURING DEVICES

[75] Inventor: Reginald F. Morton, Liskeard, England

[73] Assignee: Multiclip Company Limited, Surrey, United Kingdom

[21] Appl. No.: 76,632

[22] Filed: Jun. 15, 1993

[30] Foreign Application Priority Data

Sep. 4, 1992 [GB] United Kingdom ............... 9218789
Apr. 19, 1993 [GB] United Kingdom ............... 9308020

[51] Int. Cl.⁵ .................... F16B 13/04; F16B 35/04
[52] U.S. Cl. .............................. 411/17; 411/324; 411/424; 411/438
[58] Field of Search ............ 411/16, 17, 411, 424, 411/438, 324, 947

[56] References Cited

U.S. PATENT DOCUMENTS

| 730,585 | 6/1903 | Thiollier | 411/17 |
| 1,966,520 | 7/1934 | Rayner | 411/17 |
| 3,515,027 | 6/1970 | Textrom | 411/438 |
| 4,040,326 | 8/1977 | Breed | 411/438 X |

FOREIGN PATENT DOCUMENTS

| 2447232 | 4/1976 | Fed. Rep. of Germany | 411/17 |
| 276713 | 3/1990 | Fed. Rep. of Germany | 411/17 |
| 806455 | 12/1936 | France | 411/438 |

Primary Examiner—Neill R. Wilson
Attorney, Agent, or Firm—Nies, Kurz, Bergert & Tamburro

[57] ABSTRACT

A spiral member for improving the grip of screws in wooden or other receptive substrates is disclosed. The spiral member has a central axial drive pin by which it can be driven into a thread in the receptive substrate, and it has an improved cross section providing wings or protuberances extending out past the side surfaces of the cross section. The spiral member also has an outwardly facing triangular apex which bites into the old thread while the wings bear upon the flanks of the screw thread of the screw that inserted into the spiral member, thereby improving the grip.

13 Claims, 8 Drawing Sheets

SECURING DEVICES

BACKGROUND OF INVENTION

Field of the Invention

The present invention relates to securing screw threaded devices in receptive substrates and devices for improving the grip of such devices in receptive substrates e.g. wood or plastic or composite screw receivable materials and to restoring the grip of a screw in a hole made by the screw in such materials after a period of use. The invention has been developed with the problems of screw in rail spikes, so called screw-spikes in mind but is not limited in its capability, it is believed, only to this application through it will be specifically described with reference to such an application.

DESCRIPTION OF THE RELATED ART

The present invention is an improvement in or modification of the spiral member adapted for insertion in a substrate which is disclosed in our European patent number EP-B-188490.

In the earlier application the spiral member is of constant transverse dimension along its whole length and is formed as a spiral which has an internal diameter which tapers slightly but at a constant angle from its top end to its bottom end. The external diameter therefore also tapers slightly though arrangements in which the helix is a constant diameter are included within the earlier arrangement.

The helix or spiral member is of triangular form with the apex of the triangle pointing outwardly and with side walls of the triangle straight and the base straight or of arrow head shape. In the commercial product the base is curved in a generally elliptical shape. The lower end of the spiral is turned in across the axis and then back up the axis to afford a drive pin.

The spiral member is inserted into the hole in the sleeper by mounting it on an insertion tool which has a spiral groove in its outer surface in which the spiral member nests and an axial bore in which the axial drive pin of the spiral member is located when the spiral member is fully threaded on to the tool. In this condition a shoulder on the tool by the bore constitutes a drive shoulder and the assembly can be readily screwed into the hole. The spiral member can then be left in place in the hole by rotating the tool in the opposite direction. This concept is very effective in enabling a soft metal, e.g. aluminium, spiral member to be tightly inserted in the hole and is utilized in the present invention.

Searches of prior art have revealed a number of inserts proposed for use in reinforcing holes in wood or metal, as shown in DE 51016 (ADAMS, 1889), DE-C-126935 (THOLLIER, 1901), DE-C-144331 (THOLLIER, 1902), US 730585 (THOLLIER, 1903), GB 21852/1905 (FARRINGTON, 1906), "Der Eisenbahnbau der Gegenwart" by BARKHAUSEN et al (p. 213, published by C. W. Kreidet's Verlag, Wiesbaden 1908), US 1011392 (THOLLIER, 1911), GB-A-179144 (AARTS, 1923), NL 21113(KLOET, 1930), DE 588968 (STREIT, 1933), GB-A-449916 (STREIT, 1936), US 2150876 (CAMINEZ, 1939), US 2520232 (BEREZA, 1950), FR-A-990787 (STREIT, 1951), GB 759302 (HELICOIL, 1956), LU-A-39292 (GOMER, 1960), DE 1016066 (HELICOIL, 1958), GB 1289718 (NEUMANN, 1972), GB 2048739 (MITE, 1980), EP 0090698 A (OTALU, 1983), and GB 2184808 (MULTICLIP, 1987).

The product shown in EP-B-188490 gives excellent performance but in certain situations where the railways carry very high loads even better reinforcement of the old hole in the sleeper is desired. After careful observations and investigation we have found that one effect is relative movement between the spiral member and the screw spike in a longitudinal direction.

We have reduced this effect by careful redesign of the cross-sections of the spiral member. Merely increasing the area of the base of the spiral member was not enough. It was necessary to overcome additional frictional forces on insertion and to change the shape so that the mass of the spiral member did not increase unduly. This was achieved by designing the spiral member to initially have only point contact with the screw-spike during screwing in of the screw-spike into the spiral member inserted in the wood.

SUMMARY OF THE INVENTION

Thus according to the present invention a spiral member for increasing the resistance to pull-out of a screw made of hard material received in a hole in a body of screw-receiving material which is of softer material than the screw, the spiral member being cylindrical or being tapered towards one end and being turned inwardly at one end or at its narrow end when it is tapered to afford a drive pin adapted to be engaged by an insertion tool insertable down the inside of the spiral member so that the spiral member can be screwed into the hole from its bottom end is characterised in that the spiral member is made of material whose hardness is less than that of the screw and greater than the hardness of the screw receiving material, and in that the cross-section of the spiral member is generally triangular in shape, having a base surface which faces the axis of the spiral member and side surfaces which face outwardly from the axis and join at an apex, which may be sharp or somewhat blunted or rounded, the base surface being curved and extending out in wings or protuberances beyond the side surfaces, the side surfaces being straight or curved and the wings being rounded.

The side surfaces are preferably straight in the proximity of the apex.

The side surfaces preferably curve outwardly to blend into the wings.

The extremities of the wings define the total length of the turn and the line from the apex to the mid-point of the said length and on to the base defines the height or radial extent of the turn, the distance from the apex to the base, and will be called the median line. The turn is preferably symmetrical with regard the median line. The wings are preferably the same size and shape. Rail screw-spikes mostly have threads with one face inclined at 15° C. and the other at 45° C. to the radius of the screw-spike thus enclosing an angle of about 60°.

Some screw-spikes have the upper face at the shallower angle, others have the lower face at the shallower angle, very few have the faces at the same angle of 30°.

Preferably a spiral member in accordance with the present invention is characterised in that the ratio of the maximum axial length (ALm) of the cross-section to the half height axial length (AL0.5), namely the length perpendicular to the median line half-way from the apex of the cross-section to the base of the cross-section, ALm/AL0.5 is in excess of 1.9:1, and is preferably at least 2.0:1, e.g. at least 2.1:1, 2.2:1 or 2.3:1 or 2.4:1, or 3:1, 4:1, 5:1 or 6:1 or more, e.g. in the range 2.0:1 to 7:1 preferably in the range 2:1 to 5:1, e.g. 2:1 to 4:1 or 2.2:1 to 3.5:1.

The relationships of the ratio of axial length to height at a given height preferably satisfies the following requirement:

ALm/Hm > AL0.5/H0.5 > AL0.25/H0.25.

where H0.5, H0.25 and Hm are the lengths from the apex to half way to the base, to one quarter of the way to the base and to the point on the median line at which the axial length is a maximum, and AL0.25 is the quarter-height axial length, namely the length perpendicular to the median line one quarter of the way from the apex of the cross-section to the base of the cross-section.

In a preferred form of the invention the wings are of more complex shape and are such as to collapse or fold on being engaged by the flanks of the screw-spike. Preferably the wings are provided with notch means preferably facing outwardly from the base of the spiral member. The folding or collapsing of the wings on engagement with the screw-spike is facilitated by the notch means which may be a single notch or more than one notch in each wing. The notch may be of V or U or other cross-sectional shape. The wings in the undistorted form may expand into a bulbous form and this may extend rearwardly i.e. away from the apex and towards the base of the spiral member and may extend to the same level as the base or even beyond.

The axis of the notch means may extend out away from rather than towards or parallel to the median line of the cross-section of the spiral member. Such a structure is easier to extrude as a cross-section of stable dimensions and shape. Such a structure also presents less resistance to insertion of the screw-spike whilst still providing excellent grip in the condition when the spike is fully screwed home.

The invention also extends to a kit of parts consisting of a screw-spike and a spiral member in accordance with the invention, characterised in that the adjacent turns of the spiral fit between adjacent threads of the screw-spike and the wings of the spiral are dimensioned so as to bear respectively on the inclined upper and lower surfaces of the adjacent threads.

This enables the spiral to be used with any of the screw-spikes and is an advantage of making the turns of the spiral symmetrical about the median line. The invention is not however restricted to strict symmetry or indeed to symmetry at all; one wing could be made to extend further or be thicker than the other wing or both or one could be thinner and extend further.

The surface of the base of the turn preferably is arranged to remain clear of the root of the screw between adjacent threads at least at the beginning of insertion of the screw into the spiral.

As in EP-B-188490, the spiral member is made from a material which is harder than the material of the substrate, for example mahogany or jarrah wood or soft wood from which wooden railway sleepers are typically made, but is softer than the material of the screw-spike which is typically cast iron or steel. The material of the spiral member may also be softer than hard brass wire. Typical suitable materials are materials of a hardness of the same order of magnitude as the aluminium alloys described in the earlier application.

One suitable material for the spiral member is aluminium alloy HE9. This alloy, which is in accordance with BS 1474 No. 6063 TF, has a 0.2% proof stress value of 160 MPa, a tensile strength of 185 MPa and an elongation at break of 7%. Its composition is as follows: 0.2–0.6% SI, 0.35% Fe, 0.1% Cu, 0.1% Mn, 0.45–0.9% Mg, 0.1% Cr, 0.1% Zn, 0.1% Ti, balance aluminium.

Other grades of alloy thought likely to be useful are set out in Table 1 below with their physical properties.

TABLE 1

| Alloy | 0.2% Proof Stress MPa | Tensile Strength MPa | Elongation % |
|---|---|---|---|
| HE9-6063 TB | 70 | 130 | 14 |
| HE30-6082 TB | 120 | 190 | 14 |
| HE30-5083 O | 125 | 275 | 13 |
| HE9-6063 TE | 110 | 150 | 7 |

Thus more broadly materials with tensile strengths in the range 130 to 275 MPa and elongations of 7 to 14% are thought likely to be suitable.

We have also found that the spiral member should be made of a material which whilst hard enough to penetrate into the wood, be it the hard, e.g. mahogany, or soft woods used for sleepers is soft enough or malleable enough to conform to the threads of the spike without jumping a thread.

The spiral member is, it is believed, in effect clamped by the screw thread and the wood into which it is forced and to conform to the threads seems to need to be able to be in effect extruded or drawn by the threads as the spike is screwed in.

In addition the spiral member overfills the hole and thus the fact that it can conform to the screw spike aids the attainment of a tight grip in the hole.

The spiral member appears to wind down into the sleeper by about ¼ of a turn as the screw-spike is screwed in but also some stretching of the spiral member in length may be occurring. We are not yet certain exactly what mechanism is involved but we have found that with a mild steel spike and the hard or soft woods often used for the sleepers the aluminium alloy referred to above performs very well.

Other materials, not necessarily metals, having similar hardness and drawability, ductility, malleability or elongation characteristics to such aluminium alloys are anticipated to be effective.

BRIEF DESCRIPTION OF THE DRAWINGS

The invention may be put into practice in various ways and a number of specific embodiments of the spiral member and one of the tool will be described by way of example to illustrate the invention with reference to the accompanying drawings in which;

FIGS. 8 to 12 relate to a second embodiment of a spiral member in accordance with the present invention;

DESCRIPTION OF THE PREFERRED EMBODIMENTS

Figure 1:
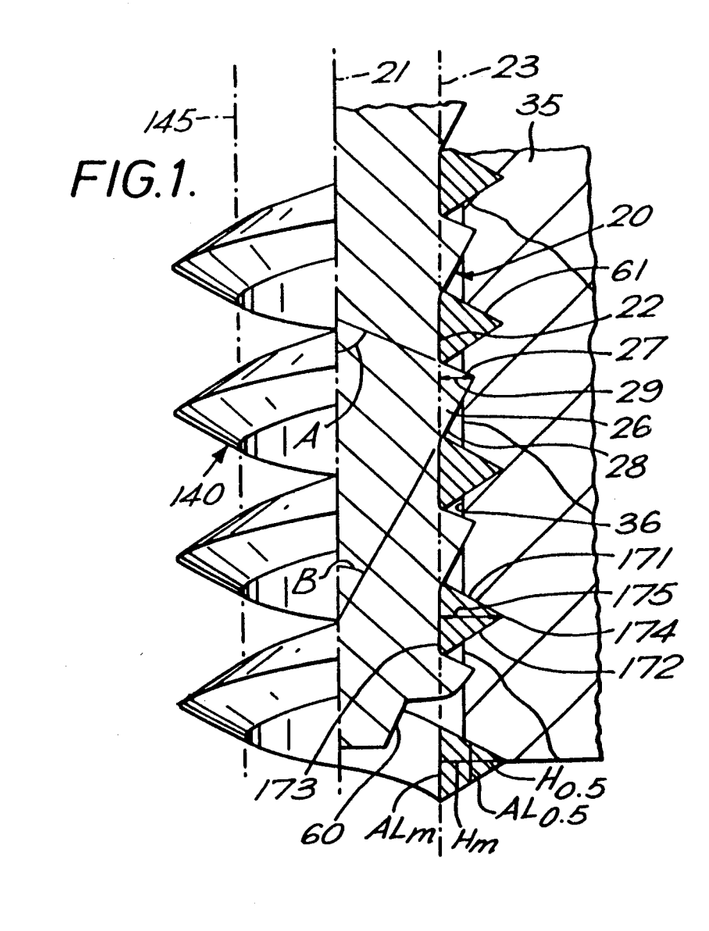
FIG. 1 is a partial longitudinal cross-section of a wooden sleeper and shows the bottom region of a securing device of the earlier case in longitudinal cross-section when inserted in an old hole from which a screw-spike has loosened and been removed and with the old screw-spike partly screwed back into the hole, the half of the spike on the left-hand side of the centre line 21 being omitted so that the whole of the metal spiral can be shown on that side, the retracted surface of the wood being shown diagrammatically in the right-hand side (this is FIG. 1 of our earlier EP 188490 B1 to which the present case is closely related and over which it is an improvement)

FIG. 1 is described in detail in EP 188490 and the disclosure thereof is incorporated herein by reference, the same reference numerals being used.

Referring first to FIG. 1 a portion of a British screw-spike 20 is shown in longitudinal section, in the right-hand half of the drawing, the line 21 being the centre line of the spike. The root 22 of the spike is tapered from top to bottom, the line 23 joining the lowest points of each root between adjacent turns, the root line 23, being inclined at an angle to the centre line 21. The taper is typically 1 mm in the 4 inches (10.2 cm) length of the screw-threaded portion of the spike, but some screw spikes are not tapered. The root carries a single helical thread 26 which engages the sleeper. The thread has an upper face 27 disposed at an angle A of about 70° to the longitudinal axis 21 of the screw-spike and a lower face 28 disposed at an angle B of about 30° to the same axis.

The thread extends out a distance 29 (the radial depth or height) from the root line 23 of about 3.1 mms or more broadly 2.5-3.5 mms.

The precise dimensions of screw spikes used in some other countries differ from those used in the United Kingdom but are of similar orders of magnitude. The spiral member is modified for such other countries to have the same or similar relationship to the spike.

When the screw-spike is first screwed into the wood 35 of the sleeper the wood conforms closely to the surface of the root and the thread on the screw-spike. The condition which obtains after a period of use is shown in diagrammatic form on the right-hand side of FIG. 1. Here the surface 36 of the wood which before use contacted or was close to the root 22 has retracted away from the root and the area of wood in contact with the upper surface 27 of the thread has been very severely reduced. The exact reason why the wood retracts in this way is not known but it may be that it is forced away from the root of the spike by the thread of the spike in the loosening process; also there may be corrosion or rotting of the wood caused by water penetrating between the wood and the metal screw-spike. The applicants have observed by tests that whilst the screw-spike can be screwed in to a tightness much the same as its original tightness which might be thought to give an adequate grip, nonetheless the resistance of the assembly to the screw-spike being pulled out has been very severely reduced, often to something as low as only 25% of its original value. A straight pull is of course, not the same as the forces which occur between the screw-spike and the sleeper in use but this change is surprising when the screw-spike seems as tightly fixed in the sleeper.

The British screw-spike is typically 7.5 inches (19 cms) long overall (though some are longer e.g. 8 inches (20.3 cms) for special purposes), and the threaded region tapers from 0.88 inches (2.24 cms) diameter at its bottom end out to 0.95 inches (2.41 cms) in diameter where it meets the unthreaded shank which is about 2.2 inches (5.6 cms) long surrounded in use by a plastics sleeve which passes through the chair to a flat bottomed round topped flange the flat bottom of which exerts pressure on the chair via the plastics sleeve. The screw-spike ends in a square head.

The screw-spike is usually made of mild steel which may be zinc coated to reduce corrosion in use. The pitch of the thread is typically 0.5 inches (1.3 cms); the thread angles and thread height have already been referred to.

Referring again to FIG. 1 a first embodiment of a spiral member 140 in accordance with our earlier case is shown in section in the right-hand half of the drawings and in elevation in the left-hand half. The spiral member has a non-circular cross-section of equilateral triangular shape having sides 171, 172, 173 and one side 173 of the triangle, the inner side, being generally parallel to the line 145 which is inclined to the axis 21 at a greater angle than is the root line 23 of the screw-spike. The side 173 affords an inner thrust face. This inner thrust face 173 bears against the root 22 of the spike between adjacent threads and as can be seen in FIG. 1 is the same size or slightly longer than the length of the root, in the longitudinal direction of the screw-spike.

The apex 174 of the triangle provides an outwardly facing projection and a cutting edge to cut into the wall of the hole, the aim being to penetrate into the unaffected wood radially outwardly of the old groove and provide an enhanced grip. The radial depth or median line 175 of the spiral member in this embodiment (the perpendicular distance) relative to the centre line from the inner thrust face 173 to the apex 174 is 5.2 mms.

The profile shown in FIG. 1 has a maximum axial length (ALm) of 6 units and a half-height axial length (AL0.5), namely the length perpendicular to the median line 175 half way from the apex 174 to the base 173, of 3.25 units. The ratio ALm/AL0.5 is thus 1.9:1.

The bottom turn of the spiral member is about 1.5–1.6 cms in internal diameter prior to insertion in a hole.

Screwing the spiral member 140 in from the bottom tends to tighten the spiral and thus reduce its diameter which facilitates its location in the shallow grooves left in the walls of the hole in the sleeper once a screw-spike has loosened and been withdrawn (e.g. screwed out).

The screw-spike 20 is shown in FIG. 1 partly reinserted with its lower end (shown diagrammatically as 60) approaching but not yet contacting the last full turn of the spiral member 140. Only the portion of the spike to the right of the centre line 21 is shown in order to facilitate showing the shape of the turns of the spiral member 140. When the screw spike is fully inserted into the triangular spiral member in the sleeper with a plastics sleeve spacing the unthreaded portion of the shank from the chair the root 22 forces each turn outwardly into the old shallow groove making it deeper and embedding the securing device in the wood of the sleeper. The threads of the screw-spike cut a new groove 61 in the portion 36 of the wood between each turn of the spiral member (see FIG. 1).

We have found that the pull out strength of such an assembly when fully inserted is of the order of 3 tons in softwood sleepers and 6.0 tons in hardwood sleepers, i.e. the pull out strength is substantially restored or at least restored to the strength of the wood around the hole.

The spiral member may be made by producing e.g. extruding, the section required (which in the embodiment shown in FIG. 1 has sides 171, 172, and 173 6 mms long and has a radial depth 175 of 5.2 mms) and then coiling it round a mandrel of the required diameter. However in order to get the inner thrust face flat against the mandrel it is also necessary to twist the triangular section.

Twisting the extruded section around the mandrel alters the cross-section due to stretching at the outer apex 174; and thus the radial depth after stretching shrinks somewhat e.g. by about 5 to 10 or 15%.

The triangular metal wire is 20.5 inches (52 cms) long before coiling and to produce seven clockwise turns of about 2.5 cms internal diameter it must first be twisted clockwise evenly between its ends through 1½ turns (540°). The mandrel is tapered so that the spiral member expands from an internal diameter for the bottom turn of 1.5–1.6 cms to an internal diameter for the top turn of 1.7 cms.

The above described spiral member made of aluminium alloy HE9 was tested for spring action. Thus it extended 1.75 inches (4.45 cms) in length over 1 second when its top end was held and a weight of 120 lbs (54.5 Kgs) was attached to the member 146, and recovered to a length of 5.5 inches (14 cms) (from an original length of 11.4 cms from the bottom of the clamp to the bottom of the member) within 1 second of being unloaded, the load having been maintained for 10 minutes. The axial length of the spiral member thus increased significantly.

This alloy which is in accordance with BS 1474 No. 6063 TF has a 0.2% proof stress value of 160 MPa, a tensile strength of 185 MPa and an elongation at break of 7%. Its composition is as follows: 0.2–0.6% Si, 0.35% Fe, 0.1% Cu, 0.1% Mn, 0.45–0.9% Mg, 0.1% Cr, 0.1% Zn, 0.1% Ti, balance aluminium.

Figure 2:
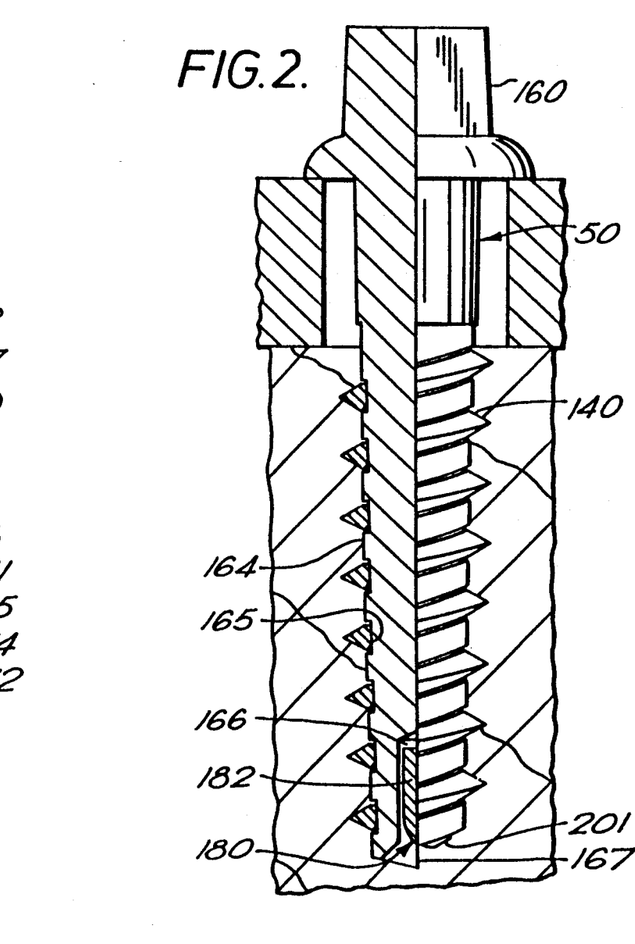
FIG. 2 shows in elevation the insertion tool of EP 188490 B1 with a spiral member in accordance with EP 188490 B1 wound on to the tool and the spiral member fully inserted in the sleeper just prior to commencement of the unwinding of the inserting tool which will leave the spiral member in the hole ready for insertion of a spike.

FIG. 2 shows a spiral member and an insertion tool in accordance with our earlier case, the same type of insertion tool being used with the spiral member of the present invention. FIG. 2 is the same as FIG. 4 of EP 188490 and the description hereof applies equally to FIG. 2 hereof and is incorporated herein by reference the same reference numerals being used herein.

The tool 50 is in a form amounting to a cutdown version of the screw-spike which is to be secured in the worn sleeper by means of the spiral member. Thus the rectangular head 160 and circular shoulders 161 are unchanged, the shank 162 may be turned-down to reduce its diameter slightly to ensure free passage through the chair, and the shank 162 at its junction with the first turn of the thread is turned-down sufficiently to prevent it gripping the inside of the hole.

The threads are turned-down to tapered flats 164, the taper being greater than that of the screw-spike with which the insert is to be used namely 13–17 or 14–18 mm internal diameter as compared with 16–17 mm, the lower value being at the bottom of the spiral. A rectangular groove 165 is formed between each flat. The axial length of the grooves e.g. ¼" (6.3 mm or 7 mm) (longer with the spiral member of the present invention) is preferably such as to provide a clearance on either side of each turn of the spiral member so that the spiral member is relatively loose on the tool e.g. the axial length of each groove being desirably 101 or 105% or 110 to 120% or 130% e.g. about 115% of the maximum axial length (e.g. 5 mm) of each turn of the spiral member.

The depth of each rectangular groove is about 5/64" (2 mm).

The lower end of the spiral member 140 provides a drive pin 180 which is turned in to the longitudinal axis of the spiral member to provide a turned in portion 201 and is bent up and back to lie along the said axis and to extend about 1 turn's length back straight up the axis of the spiral member to form an axial tail 182. This tail 182 of the drive pin is about 6 mms across and the bottom end of the insertion tool has a longitudinal axial hole 166 in it which is a close but free fit for the axial tail of the drive pin of the spiral member e.g. it may be a hole of about 7 mms diameter. The hole 166 is longer axially than the tail 182 of the drive pin. The bottom end of the insertion tool also has a generally radially extending shoulder 167 extending out from the hole 166. This shoulder engages the in-turned end portion 201 of the drive pin of the spiral member and is preferably rounded to ensure that the malleable drive pin of the spiral member is not sheared by the hard metal of the insertion tool.

The shortest length which the tail and axial hole can be and achieve their desired function is not known but they must be of such length and diameter relative to each other as to generate sufficient clamping action to prevent the shoulder 167 drawing the tail 182 out of the axial hole 166 before the spiral member is fully inserted in the hole with its upper end beneath the surface of the sleeper (so that it is locked in place in the sleeper; if this locking is not achieved the top turn would lift and the screw-spike would be more difficult to start in the spiral member).

The effect of friction of the upper turns and the end digging into the wood prevent the spiral member unwinding when the insertion tool is unwound.

It will be appreciated that if such clamping or frictional engagement does not occur the tail would be drawn out of the hole and thus due to the malleability of the preferred materials the spiral member would be deformed to conform to the groove in the insertion tool and would cease to be screwed in and the insertion tool would merely rotate through the stationary spiral member into the hole.

Figure 3:
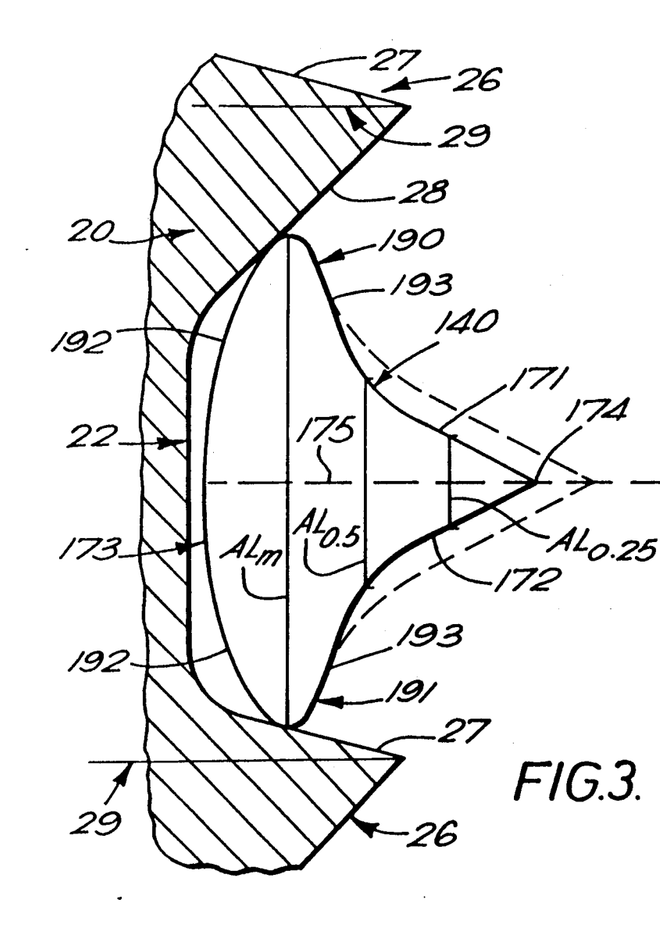
FIG. 3 is a view similar to FIG. 1 on a much enlarged scale compared to FIGS. 1 and 2 and shows parts of a screw-spike just as it is about to be wound into a first embodiment of a spiral member in accordance with the present invention.

FIG. 3 shows in cross-section a preferred form of profile for the spiral member in accordance with the present invention. The cross-section in essence is triangular, the apex of the triangle affording the outwardly facing projection 174 and the base of the triangle the thrust face 173. The height or radial depth 175 of the spiral member is 6.1 mms as extruded before being wound on the mandrel; after winding it shrinks (as described above) e.g. to about 5.7 mms.

The base corners of the triangle protrude out to produce wings or protuberances 190 and 191 which are part elliptical or oval in shape. These smoothly curve down into the base 173 on their rear faces 192. The base 173 is also curved or elliptical in shape. The wings also smoothly curve, e.g. in an S shape, into the side walls 171 and 172 at their outer faces 193.

Other shapes or proportions could be used but the effect is to give a generally mushroom shaped cross-section.

Thus the side walls 171 and 172 could be curved over their full length; the angle between 171 and 172 could be smaller or larger than that shown. An angle at 174 of 30° to 65° is thought likely to be most suitable.

The apex 174 is shown as being sharp but for some woods it could be blunted or rounded.

The profile is symmetrical about the line from the apex to the mid-point of the base which means that the extruded profile can be wound in either sense around the mandrel to form the spiral member. The profile is asymmetrical about a line passing through the mid-point of the line from the apex to the mid-point of the base and parallel to the base.

As can be seen in FIG. 3 the dimensions of the wings 190 and 191 are chosen to be such that they contact the inclined surfaces of the adjacent threads 28 and 27 respectively of the screw-spike essentially at single locations 194 and 195, whilst the curved base 173 of the profile does not contact the root 22 of the screw.

This is thought to reduce frictional forces during screwing in of the screw whilst providing enough metal of the spiral member between the threads to increase tightness once fully installed.

The full line profile shown in FIG. 3 has a maximum axial length (ALm) of 11.6 units and a half-height axial length (AL0.5), namely the length perpendicular to the median line half way from the apex 174 to the base 173, of 5.0 units. The ratio ALm/AL0.5 is thus 2.3:1. The dotted line profile has a ratio of ALm/AL0.5 of 2.4:1.

These are significantly greater than the ratio for the profile in FIG. 1 which is 1.9:1.

The tail 182 of the spiral member is preferably compressed to a more rounded form or shaved to ensure that it fits into the axial hole 166 within the tool 50.

Figure 4:
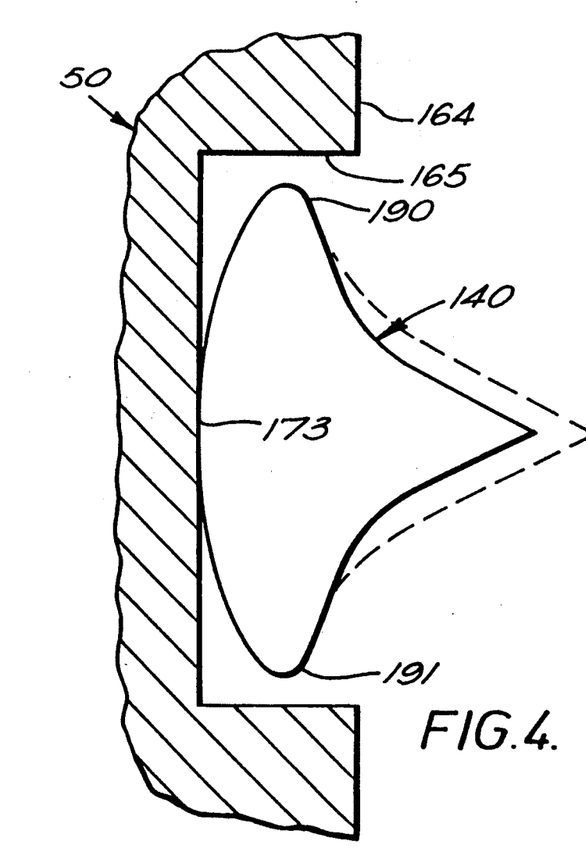
FIG. 4 is a view similar to FIG. 2 on the same scale as FIG. 3 and shows part of the insertion tool and one turn of the spiral member of the first embodiment in accordance with the present invention.

FIG. 4 shows the spiral member 140 positioned in the insertion tool 50 with its curved base 173 resting on the base of the groove 165 between the flats 164.

As can be seen the length of the spiral member 140 between its wings 190 and 191 is less than the length of the groove 165. The length of the groove 165 is longer than that in FIG. 2 and the flats 164 are correspondingly shorter.

Figure 5:
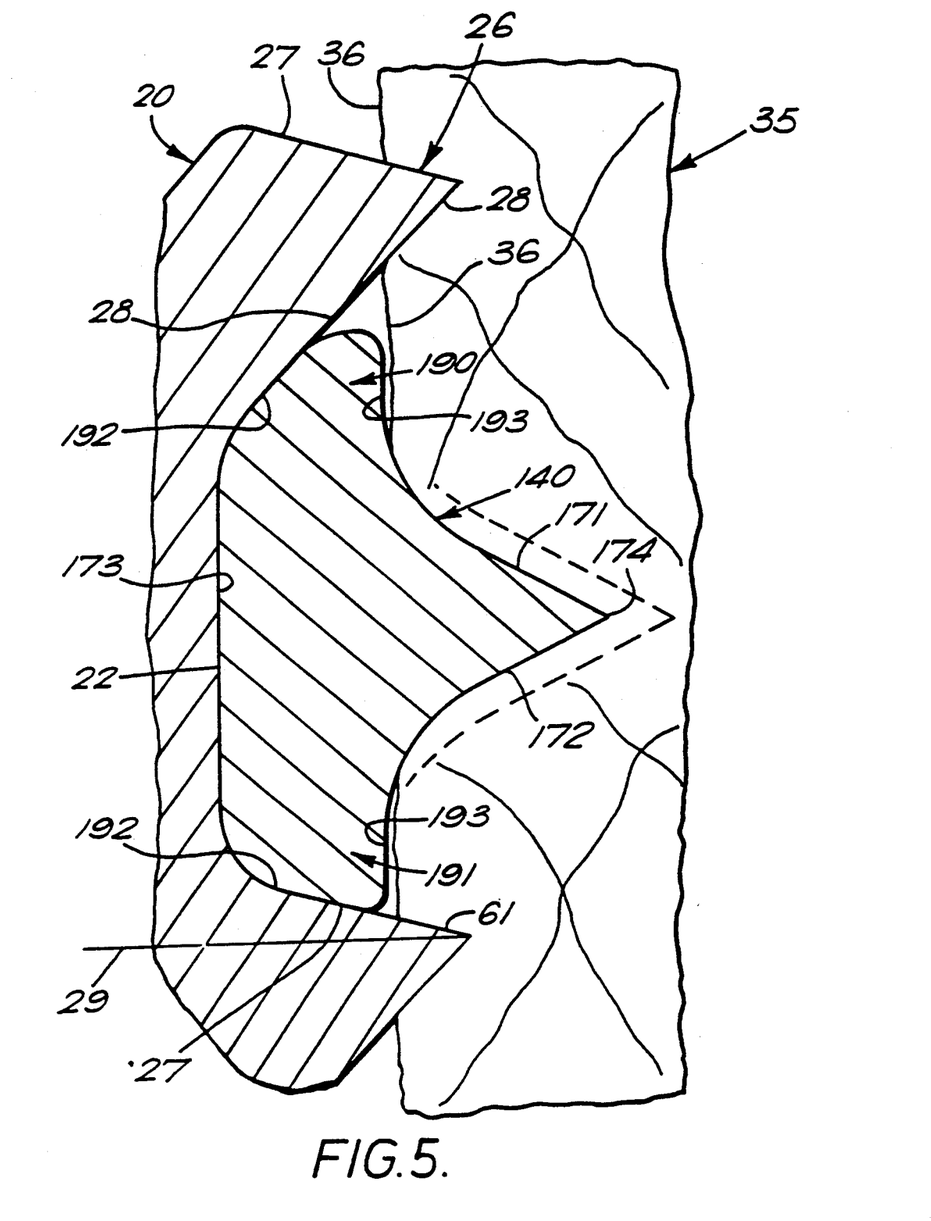
FIG. 5 is a view similar to FIG. 1 on the same scale as FIG. 3 showing the screw-spike fully screwed-in and the spiral member of the first embodiment driven into the wood of the sleeper and distorted to conform to the threads of the screw-spike.

FIG. 5 shows the spiral member 140 driven into the old groove in the sleeper with the threads 26 of the screw-spike 20 having made new grooves 61 in the surface 36 of the sleeper. The wings 190 and 191 have been deformed so that their outer faces 193 approach the surface 36 of the wood 35 more closely than in FIG. 1 and their rear faces 192 engage the inclined faces 28 and 27 over substantial areas. The curved rear face 173 conforms closely to the root 22 of the screw-spike.

Room for relative longitudinal movement between the screw-spike 20 and the spiral member 140 is thus much reduced.

Some railway lines have larger holes e.g. the English Western Region and here the radial depth 175 as extruded is 7.4 mms (i.e. the triangle is isosceles and after twisting has shrunk to 6.9 mms). In a modification the tail 182 is made thinner so as to be about 5.7 mms across so as to fit the hole in the tool without the need to modify the tool.

The dotted profile shown in FIGS. 3, 4 and 5 is for a spiral member of these larger dimensions.

For very hard woods the height of the spiral can be made less than shown in solid lines in these Figures.

Some screw-spikes have a shallow curved root rather than a flat root and the malleability of the preferred spiral member again therefore is of advantage enabling it to deform to close fitting face contact with such a curved root during insertion of the screw-spike.

Figure 6:
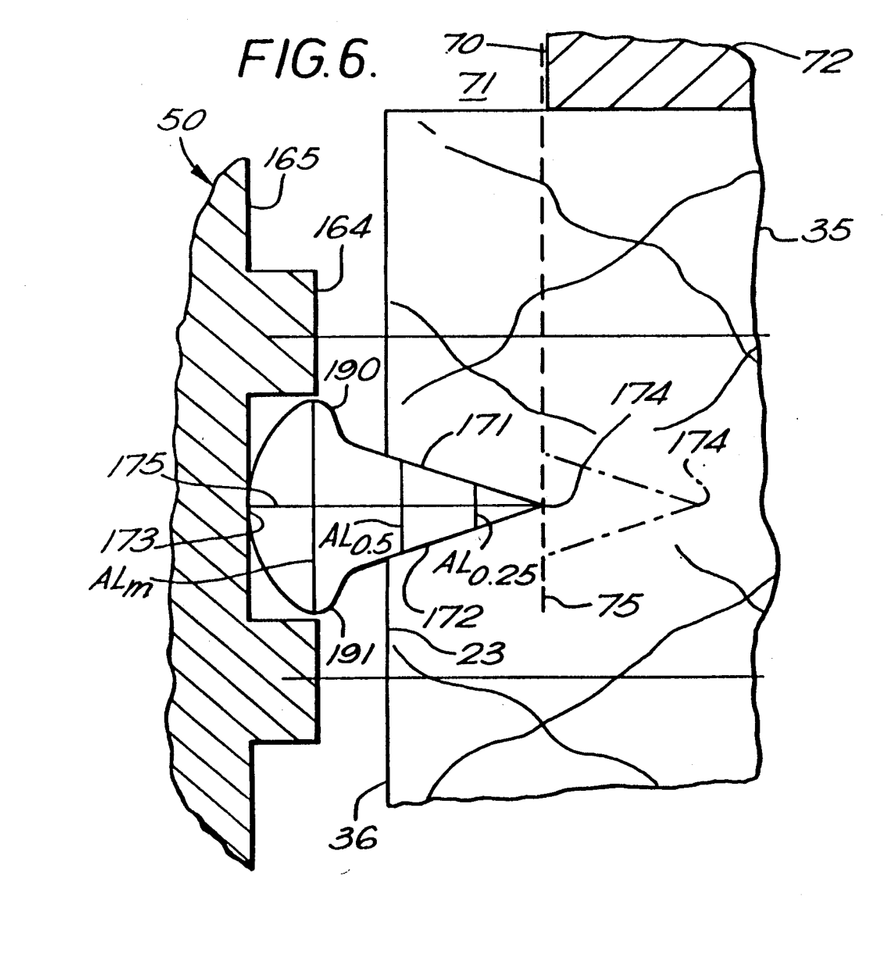
FIG. 6 a view similar to FIG. 4 but on a smaller scale showing diagrammatically the extent to which a modified form of spiral member in accordance with the present invention is driven outwardly from the insertion stage to the final stage.

FIG. 6 shows diagrammatically the relationship between the edge 70, the hole 71 in the base plate 72, the flats 164 on the insertion tool 50, and the apex 174 of the spiral member 140 on the tool 50. As can be seen from the dotted line 75 the apex 174 is just in board of the edge 70 of the hole 71.

The spiral member 140 is of modified mushroom shape in FIG. 6 compared to that in FIGS. 3, 4 and 5. The angle between surfaces 171 and 172 being smaller and these surfaces being longer. 23 designates the root line of the screw which it finally adopts when fully screwed in and is close to the surface 36 of the wood 35. As the screw is screwed into the spiral in the wood it forces the screw and its apex 174 outwardly from the position shown in full lines to that shown in dot-dash lines in the final position.

The full line profile shown in FIG. 6 has a maximum axial length (ALm) of 10.5 units and a half-height axial length (AL0.5), namely the length perpendicular to the median line half way from the apex 174 to the base 173, of 4.6 units. The ratio ALm/AL0.5 is thus 2.3:1.

Figure 7:
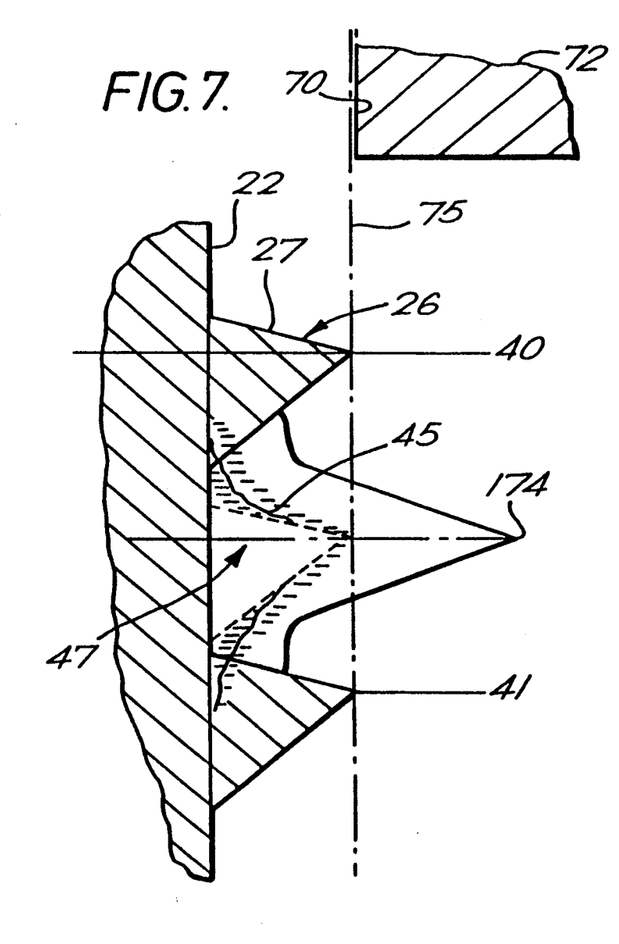
FIG. 7 is a view similar to FIG. 6 showing how the spiral member conforms to the screw.

FIG. 7 is a similar view to FIG. 6 showing the deformation of the spiral member and the original location of the thread of the screw-spike in the wood before reinforcement.

The apex of the threads 26 of the screw-spike just reach the line 75 and thus the screw-spike can pass through the hole 70.

The distance between the apeces 40 and 41 is the pitch of the thread 26.

The radial distance from the line between the apeces 40 and 41 and the apex 174 of the spiral member is the advantage gained in radial diameter by the spiral member relative to the screw.

The wings 190 and 191 are shown deformed and conforming to the inclined surfaces 28 and 27 of the screw 26 and the root 22.

The area shown cross-hatched around the line 45 is the damaged area around the original groove which was occupied by the thread 26 in its original position 47 shown in dotted lines.

Figures 8, 9:
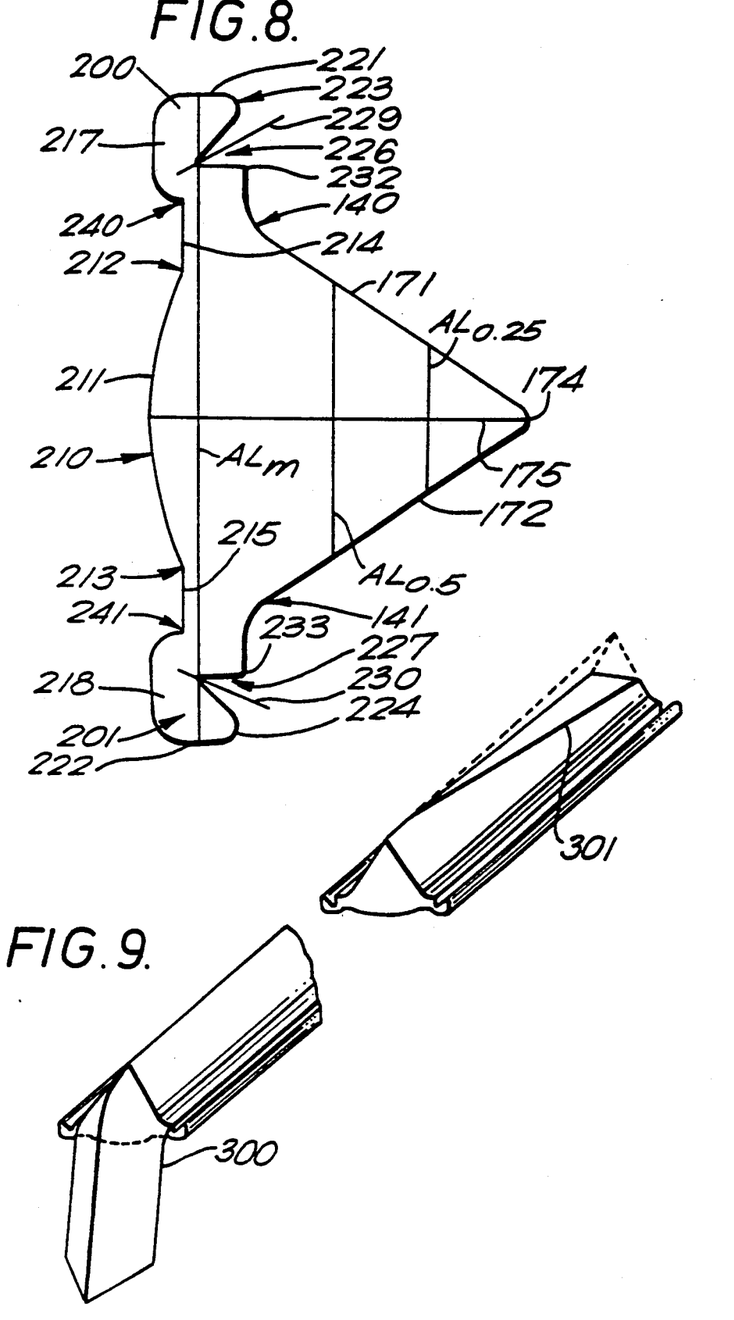
FIG. 8 is a cross-section of an extruded bar from which the spiral member is wound.
FIG. 9 is a scrap perspective view of the bar after certain preliminary fabrication steps which are carried out before winding.

Referring now to FIG. 8, like reference numerals are used for like parts as in FIGS. 1 to 7.

FIG. 8 is a cross-section of the straight extruded bar of aluminium alloy from which the spiral member is produced by winding on a mandrel as mentioned above.

FIG. 9 is a scrap perspective view showing the bar after it has had one end 300 cut and crimped down to produce a compact end which will afford the drive pin 182 and which has been turned inwards; that is around the line $AL_m$ past the inner face or base 210. This inturned end is inserted in an axial hole in the mandrel and holds the bar to the mandrel whilst it is being wound around the mandrel to form the spiral member.

The preferred form of mandrel flares out at its end remote from the end in which the hole is located. This flared portion produces an outward taper of the interior of the spiral member so that it widens out at its open top end. So as to accommodate this increase in internal diameter without an increase in external diameter, the outer face of the spiral has to be cut back. This is done by cutting a chamfer 301 along the apex of the bar as shown in FIG. 9.

Referring again to FIG. 8 the apex is 174 and the straight side walls are 171.

The wings 200 and 201 differ in shape from the wings 190, 191 in FIG. 3.

In addition the rear face 210 of the extruded section and the spiral member differs from that in FIG. 3.

Thus the rear face 210 has a curved or elliptical central portion 211 terminating at 212 and 213 and extending out in straight portions 214, 215 preferably perpendicular to the median line. These straight portions then extend out and at 240 and 241 curve round to afford bulbous portions 217, 218 extending rearwardly to about the same level as the centre of the curved base 211. The bulbous portions extend round to provide curved outer faces 220, 221 adapted to bear against the flanks 27 and 28 of the threads 26.

The forward faces 223, 224 of the bulbous portions in cross-section have notches 226, 227 preferably of V shape which face outwardly and the axes 229, 230 of which starting from the bottom of the notch are inclined outwardly with regard to the median line 178; the notches constitute grooves extending along the length of the spiral members i.e. into the paper in the drawings.

The surface of the spiral member then extends from the inner edge 232, 233 round the curve 140, 141 to the side walls 171 and 172.

As the screw-spike 20 is rotated into the spiral member the wings collapse towards the median line 175 folding around the regions 240 and 241. The regions between 212 and 240 on the rear face and 140 on the front face form a neck for one wing 200 and the region between 213 and 241 on the rear face and 141 on the front face form a neck for the other wing 201.

When the sides of the cross-section are straight the ratio of width to height at the given width measured at different heights along the median line will remain constant. Thus $AL0.5/H0.5 = AL0.25/H0.25 = AL_m/H_m$ where H0.5, H0.25 and $H_m$ are the lengths from the apex to half way to the base, to one quarter of the way to the base and to the point on the median line at which the axial length is a maximum.

For the profile in FIG. 1 these ratios are all 1.2.

For the profile in FIG. 3 these ratios are $AL_m/H_m = 11.6/5.8 = 2:1$; $AL0.5/H0.5 = 5.0/3.8 = 1.3:1$ and for $AL0.25/H0.25 = 2.4/2.3 = 1:1$.

For the profile in FIG. 6 these ratios are $AL_m/H_m = 10.5/11.6 = 0.9:1$; $AL0.5/H0.5 = 4.6/7.4 = 0.6:1$ and for $AL0.25/H0.25 = 2.4/3.7 = 0.6:1$.

For the profile shown in FIG. 8 these ratios are $AL_m/H_m = 11.7/5.8 = 2:1$; $AL0.5/H0.5 = 4.9/3.3 = 1.5:1$ and for $AL0.25/H0.25 = 2.6/1.6 = 1.6:1$. These ratios are distorted by the rounding of the apex; when this distortion is removed by extending the straight lines of the side walls at AL0.25 to produce a point apex the ratios are 1.9:1, 1.3:1 and 1.3:1 respectively.

Accordingly a spiral member in accordance with the present invention is preferably characterised by the following relationship $AL_m/H_m > AL0.5/H0.5 > AL0.25/H0.25$.

In order to reduce errors of measurement the profiles should be magnified before being measured to a size where $AL_m$ is at least 5 cms.

In one form of the invention the winding of the extruded bar shown in FIG. 8 around the mandrel is arranged to cause the wings or horns 200 and 201 to change in shape curling upwards towards the apex 174.

The amount of curling up can be varied and if desired can be omitted.

Figure 10:
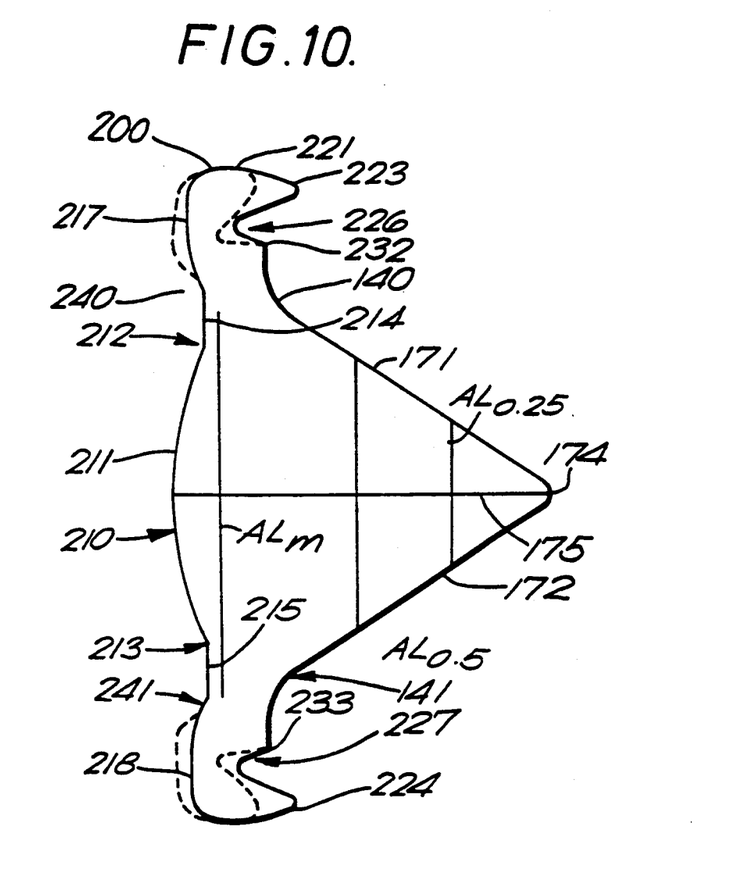
FIG. 10 is a cross-section of the bar after winding showing how the wings are made more hook-like or horn-like by the winding.
Figure 11:
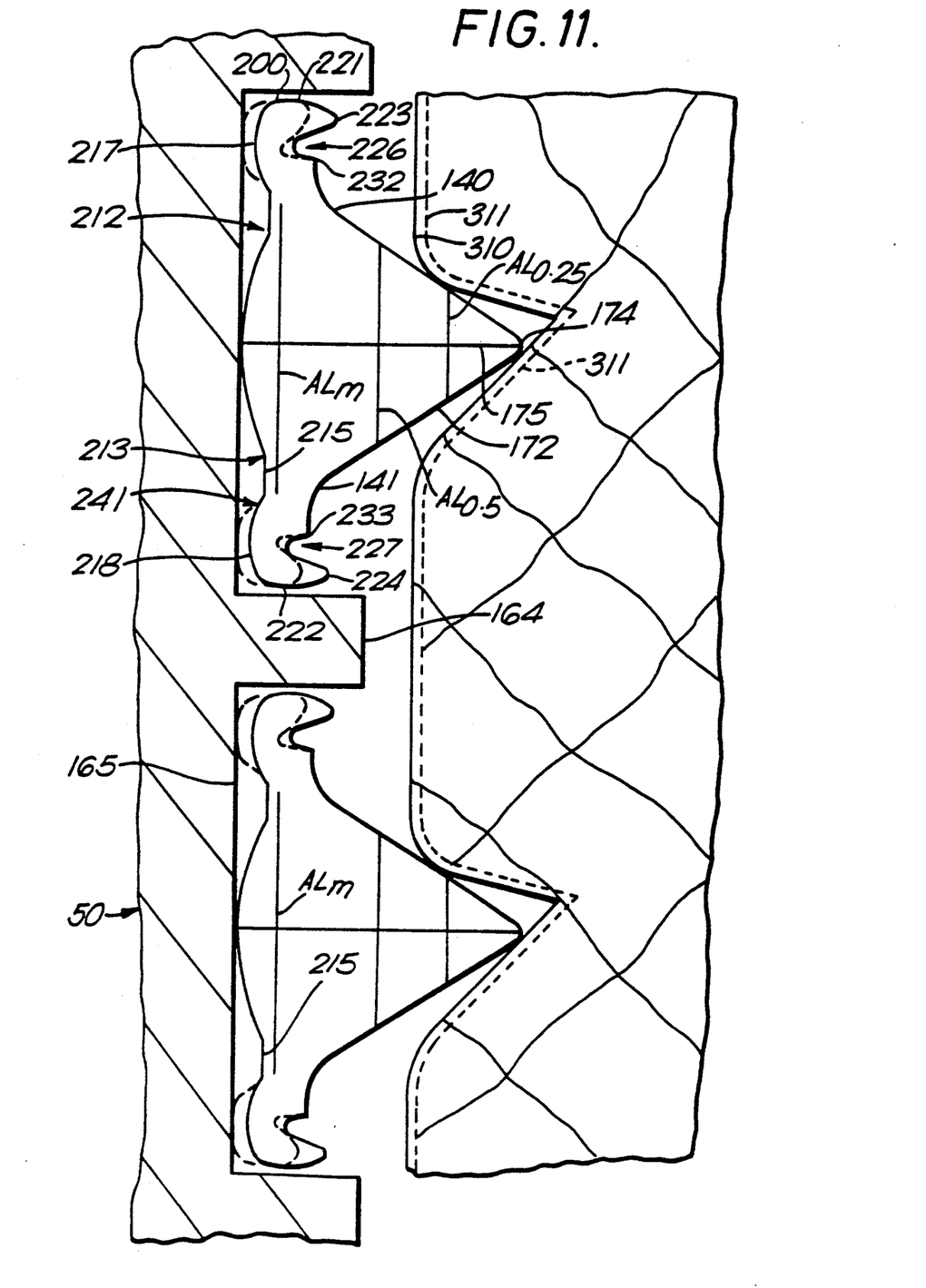
FIG. 11 is a cross-sectional view similar to FIG. 2 but showing two turns.
Figure 12:
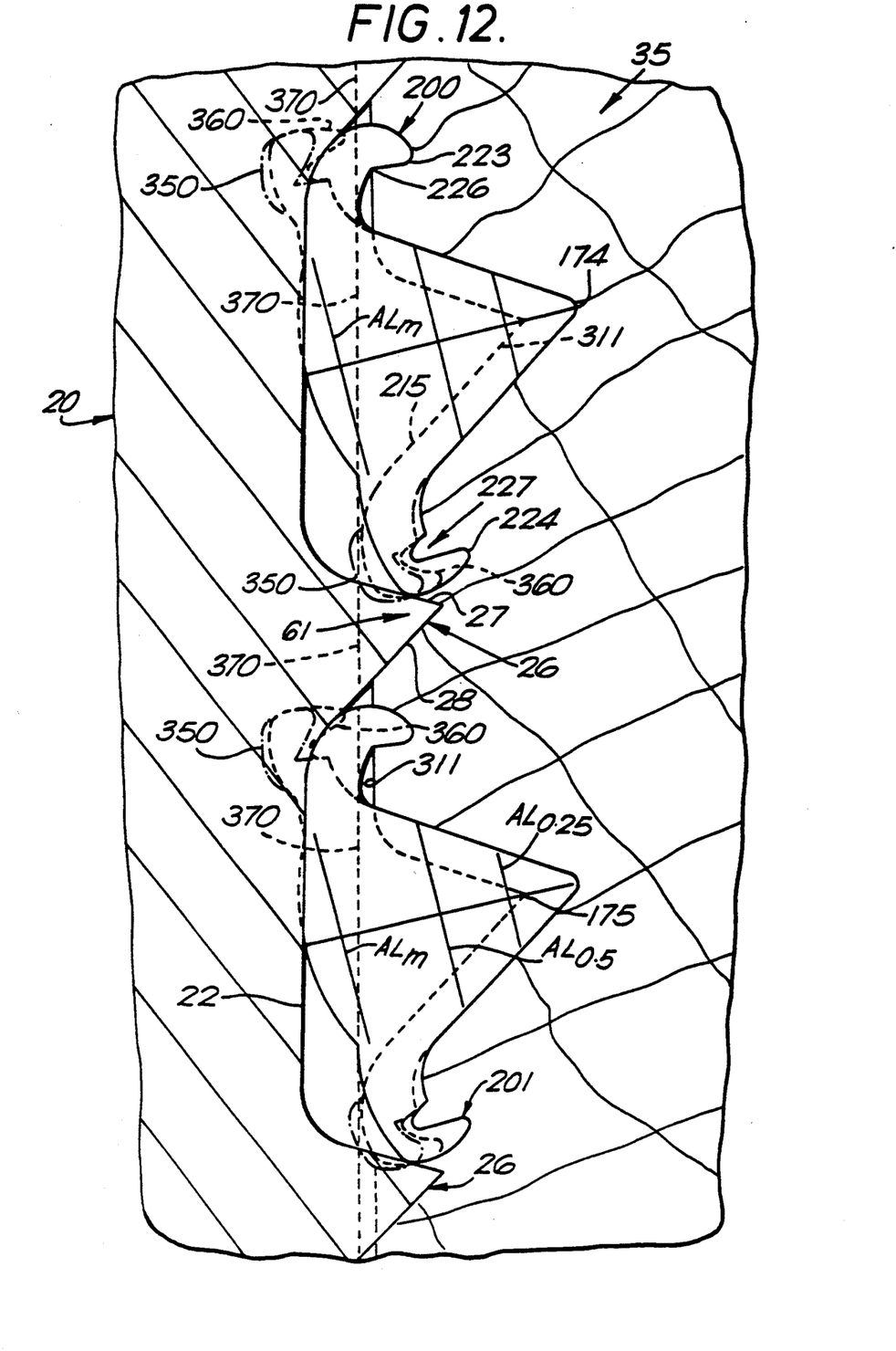
FIG. 12 is a view similar to FIG. 5 but showing two turns; 11 and 12 being on a reduced scale compared to FIG. 8.

However in the embodiments of FIGS. 10 to 12 curling up is made use of.

As can be seen in FIG. 10 the outer edge 224 has become thinned and elongated up past the point 233. The notch 227 is no longer as deep. The edge 224 now performs more like a hook. Careful inspection of a sleeper from which this form of spiral member has been removed after use reveals three notches formed in the wood, the main one by the apex 174 and two smaller notches on either side caused by 224 and 223. This triple keying effect occurs at least on the turns of the spiral member nearest the top end (that remote from the drive pin 182) though it may be less marked further down the spiral.

FIG. 11 shows the surface 310 of the wood in the sleeper immediately after a screw spike has been inserted and the surface 311 after wear has occurred. It also shows two turns of a spiral member in accordance with this second aspect of the invention, resting in the old screw thread and nested in the grooves of the insertion tool before the insertion tool is removed and before the spiral member is forced out into the wood by reinsertion of the screw spike. FIG. 11 shows the spiral member held in the insertion tool 50 with successive turns resting in grooves 165 between flats 164.

FIG. 12 shows two turns of a spiral member in accordance with the second aspect after they have been forced into the old threads beyond the line 311 of the old thread. FIG. 12 also shows two threads 26 of the screw spike.

The spiral member is twisted upwards so as to conform to the asymmetrical groove in the wood and at the same time the wings or horns 200 and 201 are further bent towards the apex 174. The precise degree of twisting and the precise degree of deformation of the wings obviously depends on the precise size relationship of the old thread, the spiral member and the screw spike. The thread can vary considerably due to differing degrees of wear and the screw spikes are not made to close tolerances. In addition screw spikes come in different sizes.

FIG. 12 is then intended to be diagrammatic and indicate the trends of twisting and distortion which are liable to occur rather than the precise amounts of such movement.

The malleability of the spiral member allows it to accommodate these variations readily.

The twisting and distortions of the wings have the beneficial effect of conforming the spiral member to the threads more closely and also affording extra gripping locations, namely the two wings, the distortions of which tend to elongate them and force them into the wood.

FIG. 12 also shows the configurations of the wings as in FIG. 8 by chain lines 350 and as in FIG. 10 by dotted lines 360.

As mentioned the surface of the wood (the worn surface) before insertion of the screw spike into the spiral member is shown by the line 311, which is dotted in parts.

The as new wood surface is indicated by the discontinuous dotted line 370.

I claim:

1. A spiral member for increasing the resistance to pull-out of a screw made of hard material received in a hole in a body of screw-receiving material which is of softer material than the screw, the spiral member being cylindrical or being tapered towards one end and being turned inwardly at one end or at its narrow end when it is tapered to afford a drive pin adapted to be engaged by an insertion tool insertable down the inside of the spiral member so that the spiral member can be screwed into the hole from its bottom end, characterised in that the spiral member is made of material whose hardness is less than that of the screw and greater than the hardness of the screw receiving material and in that the cross-section of the spiral member is generally triangular in shape, having a base surface which faces the axis of the spiral member and side surfaces which face outwardly from the axis and join at an apex, which may be sharp or somewhat blunted or rounded, the base surface being curved and extending out in wings or protuberances beyond the side surfaces, the side surfaces being straight or curved and the wings being rounded.

2. A spiral member as claimed in claim 1 characterised in that the side surfaces are straight in the proximity of the apex.

3. A spiral member as claimed in claim 1 characterised in that the side surfaces curve outwardly to blend into the wings.

4. A spiral member as claimed in claim 1 characterised in that the ratio of the maximum axial length (ALm) of the cross-section to the half-height axial length (AL0.5), namely the length perpendicular to the median line half way from the apex of the cross-section to the base of the cross-section, $ALm/AL0.5$ is in excess of 1.9:1.

5. A spiral member as claimed in claim 1 characterised by the following relationship $ALm/Hm > AL0.5/H0.5 \geq AL0.25/H0.25$.

6. A spiral member as claimed in claim 1 characterised in that the wings are of a shape such as to collapse or fold on being engaged by the flanks of the screw.

7. A spiral member as claimed in claim 6 characterised in that the wings are provided with a neck portion between the extremity of the wing and the main body of the spiral member.

8. A spiral member as claimed in claim 6 in which the wings afford a bulbous portion adapted to engage the flanks of the screw.

9. A spiral member as claimed in claim 6 characterised in that groove means are located in the wings.

10. A spiral member as claimed in claim 9 characterised in that the groove means extend away from the base of the spiral member.

11. A spiral member as claimed in claim 1 characterised in that the wings afford pointed structures adapted to bite into the screw receiving material.

12. A kit of parts consisting of a screw-spike and a spiral member as claimed in claim 1 characterised in that the adjacent turns of the spiral fit between adjacent threads of the screw spike and the wings of the spiral are dimensioned so as to bear respectively on the inclined upper and lower surfaces of the adjacent threads.

13. A kit as claimed in claim 12 characterised in that the base surface of the spiral remains clear of the root of the screw between adjacent threads at least at the beginning of insertion of the screw into the spiral.

* * * * *